United States Patent
Robinson et al.

(10) Patent No.: US 10,572,147 B2
(45) Date of Patent: Feb. 25, 2020

(54) ENABLING PERIMETER-BASED USER INTERACTIONS WITH A USER DEVICE

(71) Applicant: Verizon Patent and Licensing Inc., Arlington, VA (US)

(72) Inventors: Quentin N. Robinson, Willingboro, NJ (US); Shamik Basu, Lake Hiawatha, NJ (US); Layton R. Diament, San Francisco, CA (US); Desirae Dolphin, Piscataway, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 297 days.

(21) Appl. No.: 15/082,221

(22) Filed: Mar. 28, 2016

(65) Prior Publication Data

US 2017/0277426 A1   Sep. 28, 2017

(51) Int. Cl.
*G06F 3/0488* (2013.01)
*H04B 1/3827* (2015.01)
*G06F 1/16* (2006.01)

(52) U.S. Cl.
CPC .......... *G06F 3/04886* (2013.01); *G06F 1/163* (2013.01); *G06F 1/1643* (2013.01); *G06F 1/1692* (2013.01); *G06F 3/04883* (2013.01); *H04B 1/385* (2013.01); *G06F 2203/0339* (2013.01)

(58) Field of Classification Search
CPC .................................................. G06F 3/04886
USPC ......................................................... 715/784
See application file for complete search history.

(56) References Cited

U.S. PATENT DOCUMENTS

| | | | | |
|---|---|---|---|---|
| 4,396,977 | A  * | 8/1983 | Slater | G06F 3/037 345/173 |
| 5,959,628 | A  * | 9/1999 | Cecchini | G06F 3/04855 715/786 |
| 9,152,247 | B2 * | 10/2015 | Gargi | G06F 3/017 |
| 9,513,703 | B2 * | 12/2016 | Whitney | G06F 3/014 |
| 9,774,723 | B2 * | 9/2017 | Baldassari | H04M 1/7253 |
| 9,846,508 | B2 * | 12/2017 | Anzures | H04L 51/10 |
| 2003/0103032 | A1* | 6/2003 | Wong | G06F 1/1626 345/156 |
| 2003/0217126 | A1* | 11/2003 | Polcha | G06F 9/44505 709/220 |
| 2009/0327968 | A1* | 12/2009 | Porat | G06F 3/0482 715/841 |
| 2010/0083116 | A1* | 4/2010 | Akifusa | G06F 3/0482 715/727 |
| 2011/0157046 | A1* | 6/2011 | Lee | G04G 21/08 345/173 |
| 2011/0265002 | A1* | 10/2011 | Hong | G06F 3/04855 715/702 |
| 2013/0104113 | A1* | 4/2013 | Gupta | G06F 8/61 717/169 |
| 2013/0159939 | A1* | 6/2013 | Krishnamurthi | G06F 3/011 715/863 |

(Continued)

*Primary Examiner* — Daniel Rodriguez (57) ABSTRACT

A user device may include a display that includes a first area and a second area. The first area may be located around a periphery of the second area, and the first area may include a touch-sensitive surface. The user device may detect a user interaction with the first area and may determine an action associated with the user interaction. The user device may perform the action in association with information displayed in the second area.

20 Claims, 7 Drawing Sheets

(56) References Cited

U.S. PATENT DOCUMENTS

| | | | | |
|---|---|---|---|---|
| 2014/0157190 A1* | 6/2014 | Kim | G06F 9/451 | 715/786 |
| 2014/0181750 A1* | 6/2014 | Fujiwara | G06F 3/04817 | 715/835 |
| 2014/0229858 A1* | 8/2014 | Bleker | G06F 3/04883 | 715/753 |
| 2014/0375579 A1* | 12/2014 | Fujiwara | G06F 3/041 | 345/173 |
| 2015/0082164 A1* | 3/2015 | Chana | G06F 3/0481 | 715/705 |
| 2015/0212723 A1* | 7/2015 | Lim | G06F 3/14 | 715/760 |
| 2015/0286393 A1* | 10/2015 | Wild | B60K 37/06 | 715/771 |
| 2015/0331589 A1* | 11/2015 | Kawakita | G06F 1/163 | 715/834 |
| 2015/0350403 A1* | 12/2015 | Eim | G06F 1/163 | 455/420 |
| 2015/0378391 A1* | 12/2015 | Huitema | G06F 1/163 | 361/679.03 |
| 2016/0034112 A1* | 2/2016 | Yoon | G06F 3/0481 | 715/768 |
| 2016/0154489 A1* | 6/2016 | Collins | G06F 3/04883 | 345/173 |
| 2016/0170625 A1* | 6/2016 | Zambetti | G04G 21/00 | 715/771 |
| 2016/0202832 A1* | 7/2016 | Chen | G06F 3/0488 | 345/173 |
| 2016/0283020 A1* | 9/2016 | Heo | G06F 3/0416 | |
| 2016/0313869 A1* | 10/2016 | Jang | G06F 3/0481 | |
| 2017/0017389 A1* | 1/2017 | Lee | G06F 3/04883 | |
| 2017/0123497 A1* | 5/2017 | Yonezawa | G06F 3/0482 | |
| 2017/0147167 A1* | 5/2017 | De Luca | G04G 21/08 | |
| 2017/0223536 A1* | 8/2017 | Gupta | H04L 63/0892 | |

* cited by examiner

FIG. 7

ENABLING PERIMETER-BASED USER INTERACTIONS WITH A USER DEVICE

BACKGROUND

A touch screen is an input component that is normally layered on the top of an electronic visual display of a device. A user may provide input to and/or control the device through single and/or multi-touch gestures by touching the touch screen with one or more fingers or a stylus. The user may interact with the device by contacting the touch screen at locations corresponding to user-interface objects.

DETAILED DESCRIPTION OF PREFERRED EMBODIMENTS

The following detailed description of example implementations refers to the accompanying drawings. The same reference numbers in different drawings may identify the same or similar elements.

A wearable user device, such as a smart watch, may include a touch-sensitive display (e.g., a touch screen) that may be used to display screen information (e.g., user-interface objects and/or content), and provide a user interface via which a user may interact with the user device. The user device may detect a user interaction (e.g., a touch gesture) with the touch-sensitive display at a particular position and may perform an action corresponding to the user interaction (e.g., may update a display of screen information). However, in some cases, one or more of the user's fingers may occupy a majority of the touch-sensitive display as the user interacts with the user device. Thus, the user may obfuscate the screen information while interacting with the user device.

Implementations described herein may assist a user device in enabling perimeter-based user interactions, thereby allowing a user to manipulate screen information without directly interacting with the screen information. Implementations described herein may assist a user in efficiently using the user device by reducing a quantity of operating errors associated with using the user device, thereby conserving processor and/or memory resources.

While implementations will be described in terms of a user device in the form of a smart watch, these implementations are not limited to smart watches. In practice, these implementations may be used in conjunction with other types of user devices that have a touch-sensitive display, such as a smart phone, a tablet device, and other handheld user devices.

Figure 1:
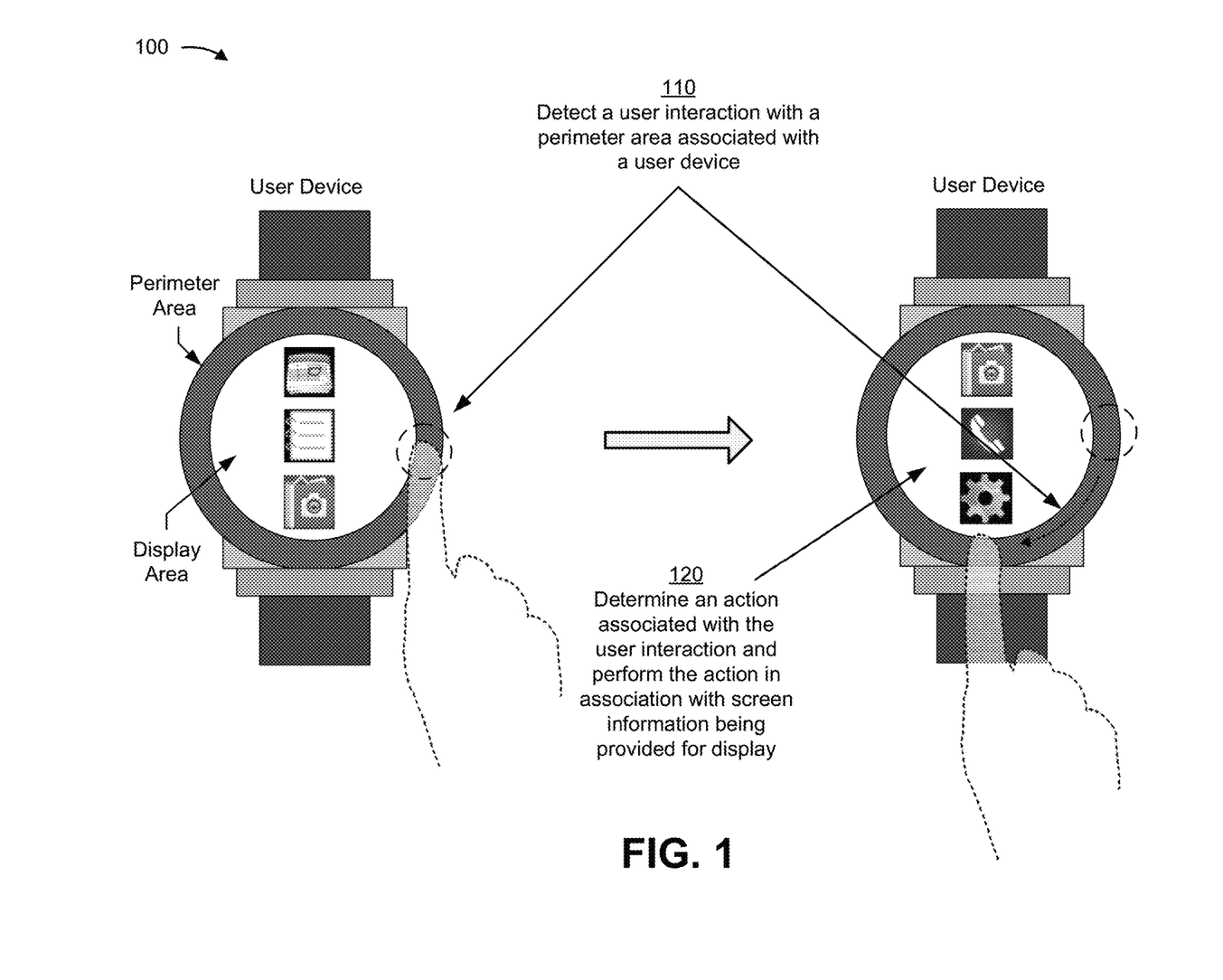
FIG. 1 is a diagram of an overview of an example implementation described herein.

FIG. 1 is a diagram of an overview of an example implementation 100 described herein. As shown in FIG. 1, and by reference number 110, a user device may detect a user interaction with a perimeter area associated with the user device. For example, the user device (e.g., a smart watch) may include a touch-sensitive surface that includes a perimeter area and a display area. As shown, the user device may detect a touch gesture (e.g., a clockwise swipe) associated with the perimeter area. For example, a user of the user device may establish a point of contact with the perimeter area at a first position (e.g., by touching the perimeter area), and may move the point of contact with the perimeter area in a clockwise direction to a second position.

As shown by reference number 120, the user device may determine an action associated with the user interaction. For example, the user device may determine an action (e.g., a scroll) to be performed in association with screen information (e.g., user-interface objects, such as icons) being displayed in association with the display area. The user device may determine the action based on mapping the user interaction to the action. As further shown by reference number 120, the user device may perform the action in association with screen information being provided for display. For example, as shown, the user device may perform a vertical scroll (e.g., may scroll through the user-interface objects) based on the user interaction with the perimeter area.

Implementations described herein may assist a user in navigating screen information by performing touch gestures in association with a perimeter area of a user device. In this way, the screen information may remain visible to the user as the user interacts with the user device. Implementations described herein may reduce a quantity of operating errors associated with using a user device, thereby conserving processor and/or memory resources of the user device.

As indicated above, FIG. 1 is provided merely as an example. Other examples are possible and may differ from what was described with regard to FIG. 1.

Figure 2:
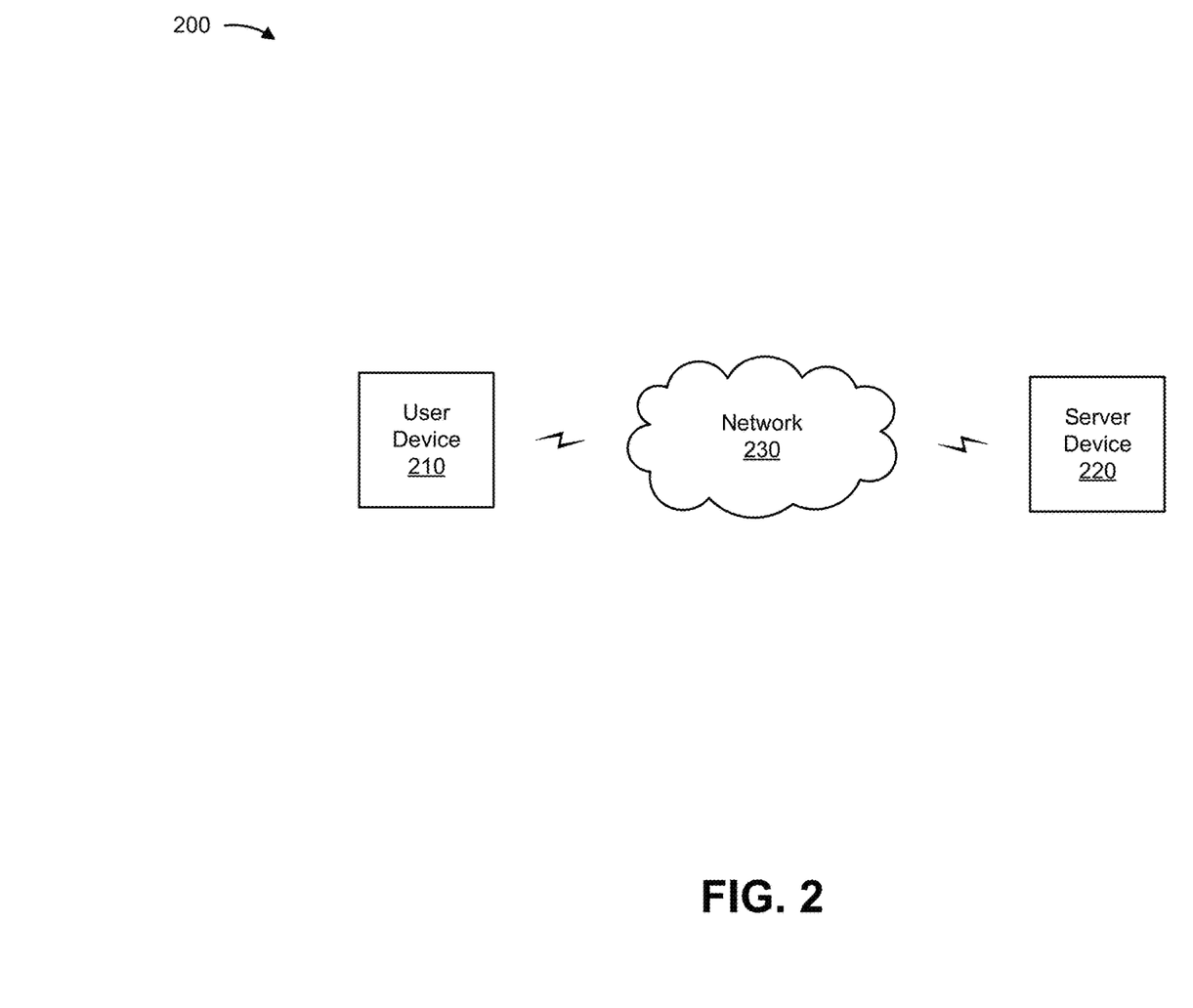
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, and a network 230. Devices of environment 200 may interconnect via wired connections, wireless connections, or a combination of wired and wireless connections.

User device 210 includes one or more devices capable of receiving, generating, storing, processing, and/or providing information associated with a perimeter-based user interaction. For example, user device 210 may include a communication and/or computing device, such as a wearable communication device (e.g., a smart wristwatch, an activity band, or a pair of smart eyeglasses), a mobile phone (e.g., a smart phone or a radiotelephone, etc.), a laptop computer, a tablet computer, a handheld computer, a gaming device, or a similar type of device.

Server device 220 includes one or more devices capable of receiving, generating, storing, processing, and/or providing information associated with a perimeter-based user interaction. In some implementations, server device 220 may include a communication interface that allows server device 220 to receive information from and/or transmit information to other devices in environment 200. For example, server device 220 may provide, to user device 210, information that identifies a mapping of a user interaction to an action. Additionally, or alternatively, server device 220 may provide information (e.g., a configuration file and/or a soft key map file) that enables user device 210 to detect and/or determine user interactions with a perimeter area of user device 210.

Network 230 may include one or more wired and/or wireless networks. For example, network 230 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
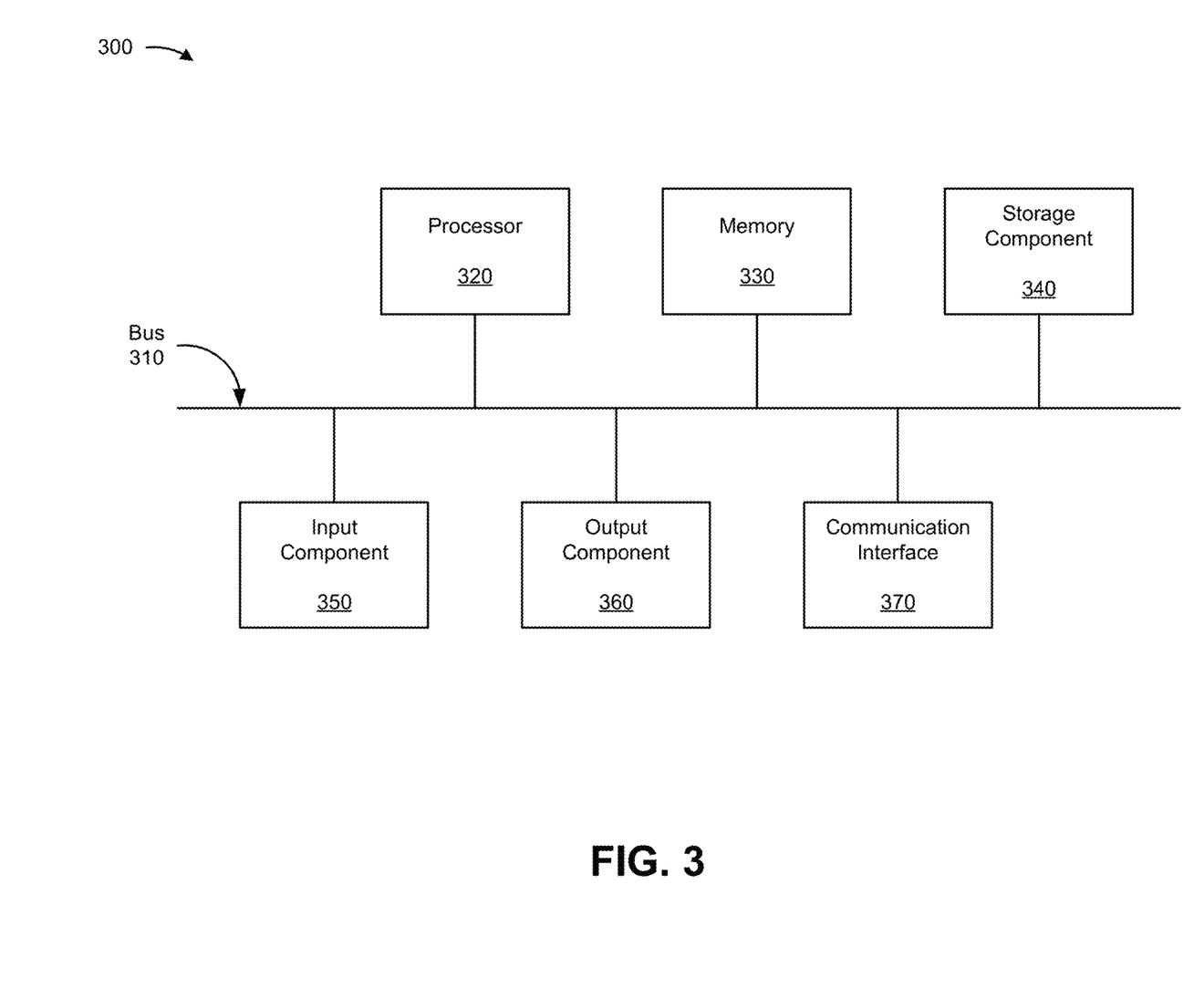
FIG. 3 is a diagram of example components of one or more devices of FIG. 2.

FIG. 3 is a diagram of example components of a device 300. Device 300 may correspond to user device 210 and/or server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, one or more touch-sensitive surfaces, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
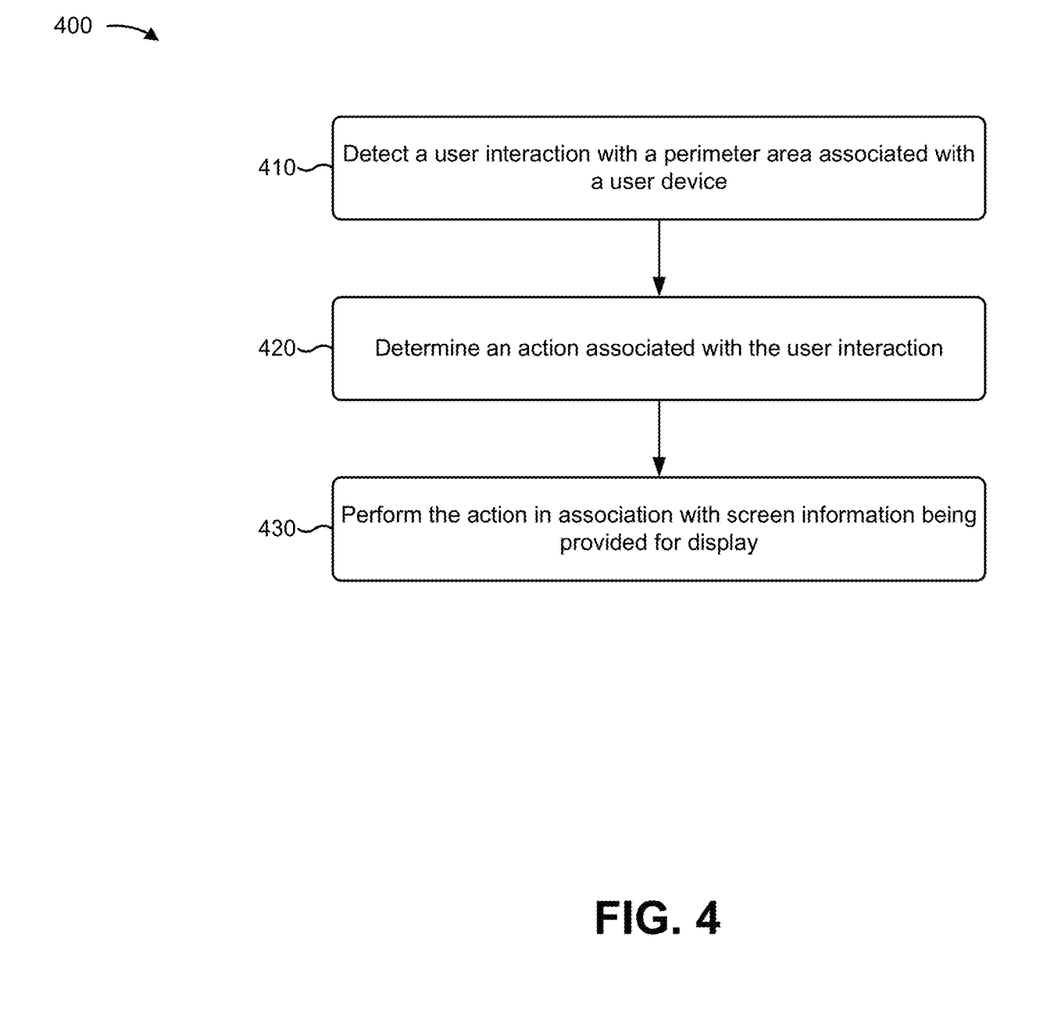
FIG. 4 is a flow chart of an example process for enabling perimeter-based user interactions with a user device.

FIG. 4 is a flow chart of an example process 400 for enabling perimeter-based user interactions with a user device. In some implementations, one or more process blocks of FIG. 4 may be performed by user device 210. In some implementations, one or more process blocks of FIG. 4 may be performed by another device or a group of devices separate from or including user device 210, such as server device 220.

As shown in FIG. 4, process 400 may include detecting a user interaction with a perimeter area associated with a user device (block 410). For example, user device 210 may detect a user interaction (e.g., a touch gesture) with a perimeter area associated with user device 210. In some implementations, user device 210 may include a touch-sensitive surface that includes both a perimeter area and a display area. Additionally, or alternatively, the display area (e.g., a touch screen) may provide screen information for display whereas the perimeter area may not provide screen information for display. In some implementations, the perimeter area may be separate from the display area (e.g., the perimeter area and the display area may include separate surfaces). Alternatively, the perimeter area may be an extension of the display area. In some implementations, the perimeter area may partially or completely surround the display area. For example, the perimeter area and the display area may form a planar surface where the perimeter area forms a perimeter around the display area and/or is located around a periphery of the display area. Alternatively, a surface of the perimeter area may be perpendicular to a surface of the display area, in some implementations.

In some implementations, the display area may display screen information. For example, screen information may include content, such as video, images, and/or text. Additionally, or alternatively, screen information may include user-interface objects, such as icons, menus, lists, boxes, soft keys (e.g., "virtual keys"), and/or the like. In some implementations, the screen information may be associated with a particular screen (e.g., a home screen, a settings screen, and/or an application screen), a particular sequence of screens, and/or the like. In some implementations, the perimeter area may not display screen information. Additionally, or alternatively, the perimeter area may display a subset of screen information and/or may include one or more user-interface objects (e.g., soft keys).

In some implementations, user device 210 may selectively display the perimeter area. For example, user device 210 may modify (e.g., reduce) a size of the display area based on detecting a user interaction (e.g., may display the perimeter area and the display area via a display when the user interaction is detected). Additionally, user device 210 may increase the size of the display area based on detecting that the user interaction has ended or that another user interaction has occurred (e.g., may display the display area and not the perimeter area via the display such that the display area covers an entirety of the display). Additionally, or alternatively, user device 210 may selectively display the perimeter area based on an application that is presenting screen information in the display area. For example, user device 210 may display the perimeter area for a particular application, which may allow the user to interact with the perimeter area to manipulate screen information associated with the particular application. Additionally, or alternatively, user device 210 may not display the perimeter area for another application that is presenting screen information in the display area (e.g., may display the display area and not the perimeter area).

In some implementations, the user interaction may include a touch gesture (e.g., a single touch gesture and/or a multi-touch gesture). For example, user device 210 may detect a single touch gesture based on detecting a single point of contact (e.g., a press of a user's finger) with a touch-sensitive surface of user device 210, a movement associated with the point of contact, and/or a break (e.g., a lift of the user's finger) of the single point of contact. Additionally, or alternatively, user device 210 may detect a multi-touch gesture based on detecting multiple points of contact with a touch-sensitive surface of user device 210. In some implementations, a touch gesture may include a tap, a double-tap, a tap and hold, a nudge, a pinch, a spread, a slide, a drag, a flick, or a swipe. The user may perform a touch gesture using an appendage (e.g., a finger) and/or an object (e.g., a stylus).

In some implementations, user device 210 may determine a parameter associated with the user interaction. For example, user device 210 may determine a quantity of points of contact, a position associated with a point of contact (e.g., a position of an initial point of contract, positions associated with a movement of the point of contact, and/or a position of a break of the point of contact), a direction of the user interaction, a speed of the user interaction, a velocity of the user interaction, an acceleration of the user interaction, a duration of the user interaction, and/or the like. In some implementations, user device 210 may determine a position associated with a user interaction based on coordinate values (e.g., associated with a coordinate system), and may determine a change in position based on a change in coordinate values. Additionally, or alternatively, user device 210 may determine a position based on an angular value (e.g., relative to a particular point or axis associated with user device 210), and may determine a change in position based on an increment and/or decrement in the angular value. In some implementations, user device 210 may perform an action based on a user interaction, as described below. Additionally, or alternatively, user device 210 may perform an action based on a parameter associated with a user interaction satisfying a threshold.

In some implementations, user device 210 may determine that a user interaction is associated with the perimeter area. For example, user device 210 may determine a position of an initial point of contact associated with the user interaction, and may determine whether the position is associated with the perimeter area or the display area (e.g., based on a configuration file or a soft key map file). In some implementations, user device 210 may determine whether the user interaction is associated with the perimeter area or the display area based on a coordinate value (or values) of a touch position (or positions). Additionally, user device 210 may determine and/or perform different actions associated with the user interaction based on determining whether the user interaction is associated the perimeter area or the display area. In some implementations, user device 210 may determine an action associated with the user interaction (e.g., a mapping of a user interaction to an action) based on determining that the user interaction is associated with the perimeter area. In this way, user device 210 may detect a user interaction with the perimeter area and may determine an action associated with the user interaction, as described below.

As further shown in FIG. 4, process 400 may include determining an action associated with the user interaction (block 420). For example, user device 210 may determine an action that is to be performed in association with screen information being provided for display in association with the display area. In some implementations, user device 210 may determine an action associated with the user interaction based on mapping the user interaction with the perimeter area to an action to be performed in association with screen information being provided for display in association with the display area. For example, user device 210 may store information (e.g., in a data structure) that identifies a mapping of a user interaction to an action. In some implementations, an action may include a scroll (e.g., a horizontal, vertical, or circular scroll operation), a selection, a zoom (e.g., a zoom-in operation), a rotation, a drag, a fling, a pan, a tilt, an expansion, a collapse, and/or the like.

In some implementations, user device 210 may map a single touch gesture (e.g., associated with a single point of contact) to an action. For example, user device 210 may map a swipe (e.g., a horizontal swipe, a vertical swipe, a counterclockwise swipe, or a clockwise swipe) to a scroll (e.g., a horizontal scroll, a vertical scroll, a clockwise scroll, or a counterclockwise scroll). Additionally, or alternatively, user device 210 may map a tap to a selection.

In some implementations, user device 210 may map a multi-touch gesture to an action. For example, user device 210 may map a first swipe associated with a first point of contact and a second swipe associated with a second point of contact with a zoom. In some implementations, the first swipe may be associated with a first direction (e.g., clockwise), whereas the second swipe may be associated with a second direction (e.g., counterclockwise).

Additionally, or alternatively, user device 210 may map a multi-touch gesture associated with a first swipe and a second swipe to a rotation. For example, the first swipe and the second swipe may be associated with a same direction (e.g., counterclockwise or clockwise). Additionally, or alternatively, user device 210 may map a multi-touch gesture, where the first point of contact is associated with a swipe and the second point of contact is associated with a tap and hold, with a rotation.

In some implementations, user device 210 may determine multiple actions associated with a user interaction. For example, user device 210 may determine that a user interaction (e.g., a swipe) is associated with multiple actions (e.g., a scroll and/or a zoom). In some implementations, user device 210 may determine an action associated with the user interaction based on the screen information and/or based on an application associated with the screen information. Additionally, or alternatively, user device 210 may store information (e.g., in a data structure) that identifies a mapping of a user interaction to an action associated with an application and/or screen information. Additionally, or alternatively, user device 210 may identify an application associated with the screen information and/or a type of screen information (e.g., a list, a menu, and/or a map), and may determine an action associated with the user interaction based on the application and/or the type of screen information. For example, if the screen information is associated with a particular application (e.g., a map application), then user device 210 may determine that a particular user interaction (e.g., a swipe) is associated with a particular action (e.g., a rotation). Alternatively, if the screen information is associated with a list of user-interface objects, then user device 210 may determine that the same user interaction (e.g., the swipe) is associated with a different action (e.g., a scroll).

Additionally, or alternatively, user device 210 may determine an action associated with the user interaction based on a screen (e.g., a home screen, a settings screen, and/or a screen associated with an application). For example, user device 210 may determine a first action associated with a user interaction based on a first screen associated with an application, and may determine a second action associated with the same user interaction based on a second screen associated with the application. In this way, user device 210 may perform one or more actions in association with screen information based on the user interaction and/or based on an application or a screen associated with the screen information, as described below.

In some implementations, user device 210 may determine an action associated with the user interaction based on a configuration (e.g., a user-configuration). For example, user device 210 may receive input (e.g., from a user of user device 210) identifying an action to be performed in association with a user interaction. In some implementations, the configuration may map a user interaction to an action to be performed in association with particular screen information, screen information associated with a particular application, screen information associated with a particular screen, or the like.

In some implementations, user device 210 may receive information identifying a configuration (e.g., from server device 220). Additionally, or alternatively, user device 210 may provide information (e.g., an instruction, such as an executable file) to another device (e.g., server device 220 and/or another user device 210). For example, user device 210 may generate the information (e.g., the executable file) and may provide the information to another device. Additionally, the other device may execute the information, which may allow the other device to identify and/or store a user configuration. In this way, user device 210 may provide, to another user device 210, information that identifies a configuration, thereby allowing the other user device 210 to identify a configuration without the user having to re-configure the other user device 210. In this way, processor and/or memory resources may be conserved.

As further shown in FIG. 4, process 400 may include performing the action in association with screen information being provided for display (block 430). For example, user device 210 may perform an action in association with screen information being provided for display in the display area. In some implementations, user device 210 may perform an action in association with the screen information based on the user interaction with the perimeter area.

In some implementations, user device 210 may perform the action based on a parameter, such as a velocity parameter, an acceleration parameter, a duration parameter, or the like, associated with the user interaction. For example, user device 210 may scroll through screen information (e.g., multiple user-interface objects, such as a list) at a particular rate based on a velocity and/or an acceleration associated with the user interaction. In this way, a user may control the rate at which displayed screen information is updated.

In some implementations, user device 210 may perform a particular action based on an application associated with user device 210 and/or based on the screen information. For example, assume that user device 210 determines that the user interaction (e.g., a swipe) is associated with a particular action (e.g., a zoom). Further, assume that an application associated with the screen information is incapable of processing the user interaction (e.g., the application is not configured to process perimeter-based user interactions). In such cases, user device 210 may determine another action (e.g., an action that is native to an operating system associated with user device 210 and/or the application) and may perform the other action (e.g., a scroll).

Additionally, or alternatively, user device 210 may determine multiple actions (e.g., a scroll and/or a zoom) associated with a user interaction (e.g., a swipe), and may provide information (e.g., one or more events) that identifies the user interaction and/or one or more parameters associated with the user interaction to an application associated with user device 210. In this way, an application associated with user device 210 may process a particular event and user device 210 may perform a corresponding action based on the application processing the event.

In some implementations, the action may be associated with a particular application. For example, an action may execute the application, close the application, quit the application, select a feature associated with an application, adjust a setting associated with the application, navigate screen information associated with the application, navigate screens associated with the application, or the like. Additionally, or alternatively, the action may include responding to (e.g., answering or dismissing) a notification (e.g., a voice call, a message (e.g., short message service (SMS) message), or a prompt), causing another device (e.g., a connected device) to respond to a notification, locking user device 210, unlocking user device 210, and/or the like.

Implementations described herein may assist a user in navigating screen information being provided for display via a user device by performing perimeter-based user interactions. In this way, screen information may remain visible to the user as the user interacts with the user device. Implementations described herein may reduce a quantity of operating errors associated with using a user device and may enable a user to use the user device more efficiently, thereby conserving processor and/or memory resources of the user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
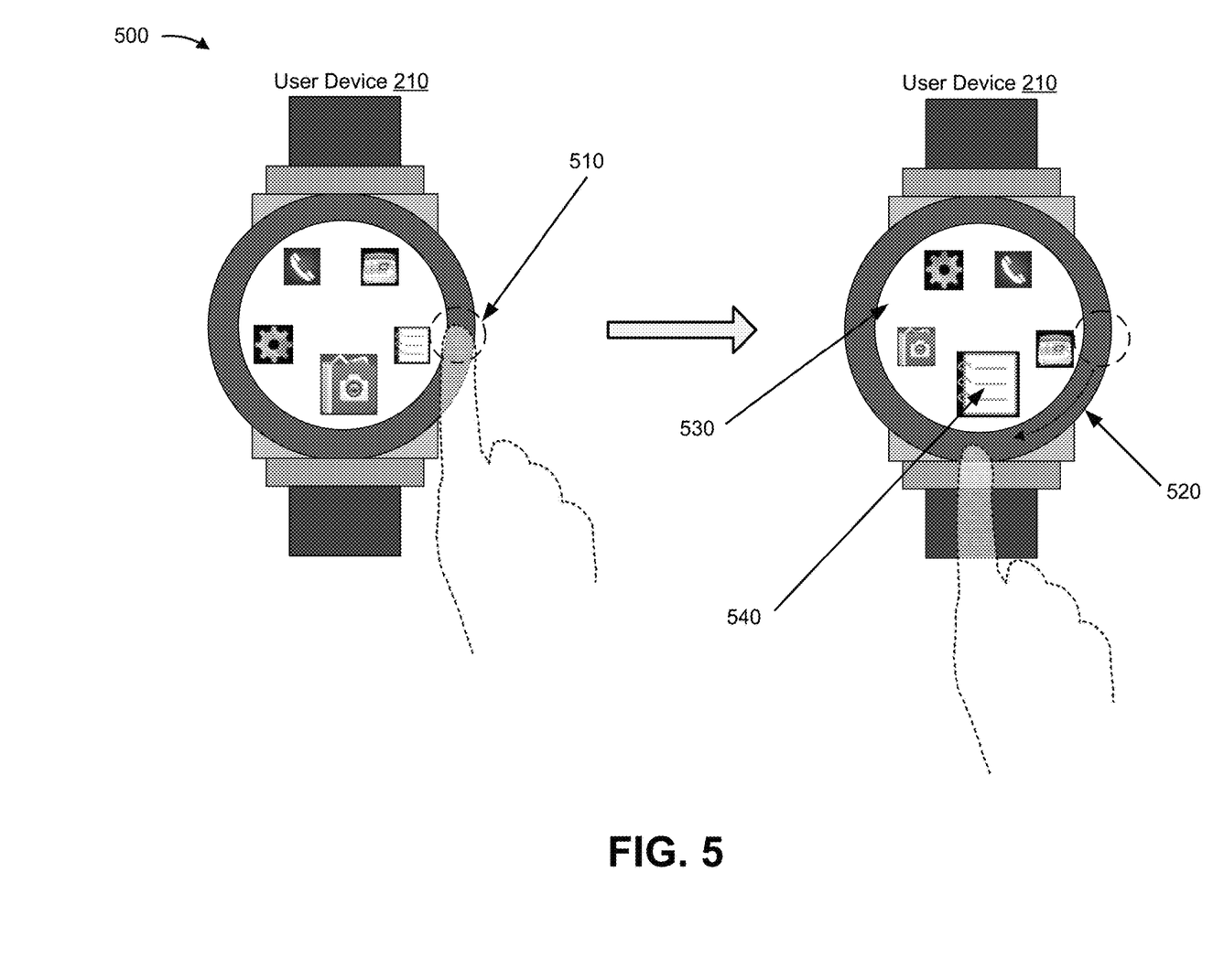
FIG. 5 is a diagram of an example implementation relating to the example process shown in FIG. 4.

FIG. 5 is a diagram of an example implementation 500 relating to example process 400 shown in FIG. 4. FIG. 5 shows an example of enabling perimeter-based user interactions with a user device.

As shown in FIG. 5, user device 210 may scroll through screen information based on detecting a swipe. For example, as shown by reference number 510, a user may interact with (e.g., touch) the perimeter area of user device 210 at a first position to establish a point of contact. As shown by reference number 520, the user may move the point of contact in a clockwise direction to a second position (e.g., may perform a clockwise swipe). User device 210 may detect the user interaction with the perimeter area and may determine an action associated with the user interaction.

As shown by reference number 530, user device 210 may scroll through screen information (e.g., user-interface objects, such as icons) associated with a display area of user device 210. For example, as shown, user device 210 may provide multiple user-interface objects (e.g., icons) for display in association with the display area. Additionally, assume that user device 210 may scroll through the user-interface objects in a clockwise and/or counterclockwise manner. Further, as shown by reference number 540, assume that a particular user-interface component is in a selected position. In some implementations, a user may perform another user interaction (e.g., a tap) with the perimeter area to select a user-interface object that is in the selected position (e.g., to open an application and/or navigate to a screen). In this way, a user may perform one or more user interactions with the perimeter area of user device 210 to navigate and/or select screen information while leaving the display area unencumbered.

As indicated above, FIG. 5 is provided merely as an example. Other examples are possible and may differ from what was described with regard to FIG. 5.

Figure 6:
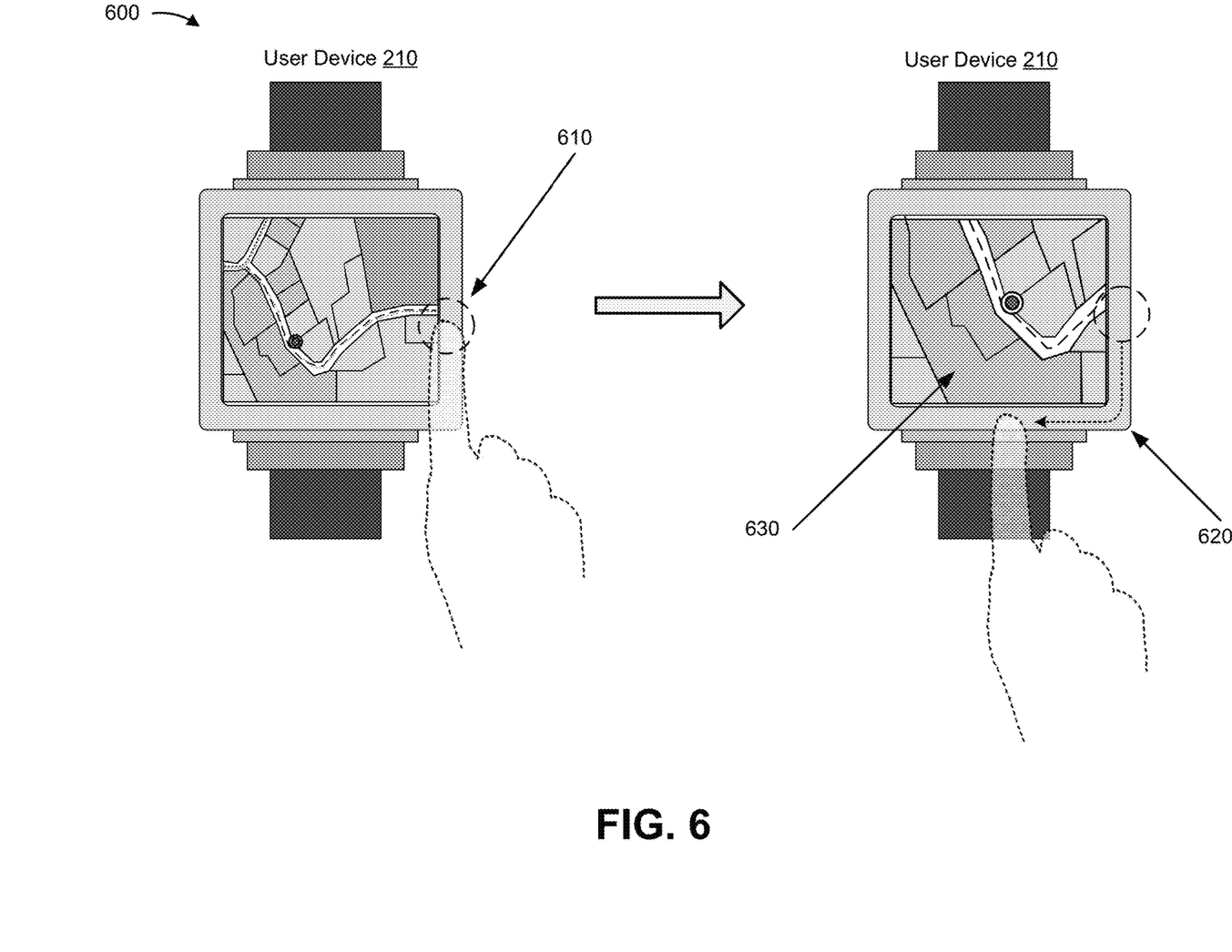
FIG. 6 is a diagram of an example implementation relating to the example process shown in FIG. 4.

FIG. 6 is a diagram of an example implementation 600 relating to example process 400 shown in FIG. 4. FIG. 6 shows an example of enabling perimeter-based user interactions with a user device.

As shown in FIG. 6, user device 210 may zoom in on screen information based on a swipe. For example, as shown by reference number 610, a user may interact with the perimeter area of user device 210 at a first position to establish a point of contact. As shown by reference number 620, the user may move the point of contact in a vertical direction and then in a horizontal direction (e.g., to perform a clockwise swipe). User device 210 may detect the user interaction and may determine an action associated with the user interaction.

As shown by reference number 630, user device 210 may zoom in on screen information (e.g., a map associated with a map application) being displayed in association with the display area. In some implementations, a user may perform another user interaction (e.g., a swipe in a counterclockwise direction) to cause user device 210 to zoom out. In this way, a user may perform one or more user interactions with the perimeter area of user device 210 to manipulate screen information.

As indicated above, FIG. 6 is provided merely as an example. Other examples are possible and may differ from what was described with regard to FIG. 6.

Figure 7:
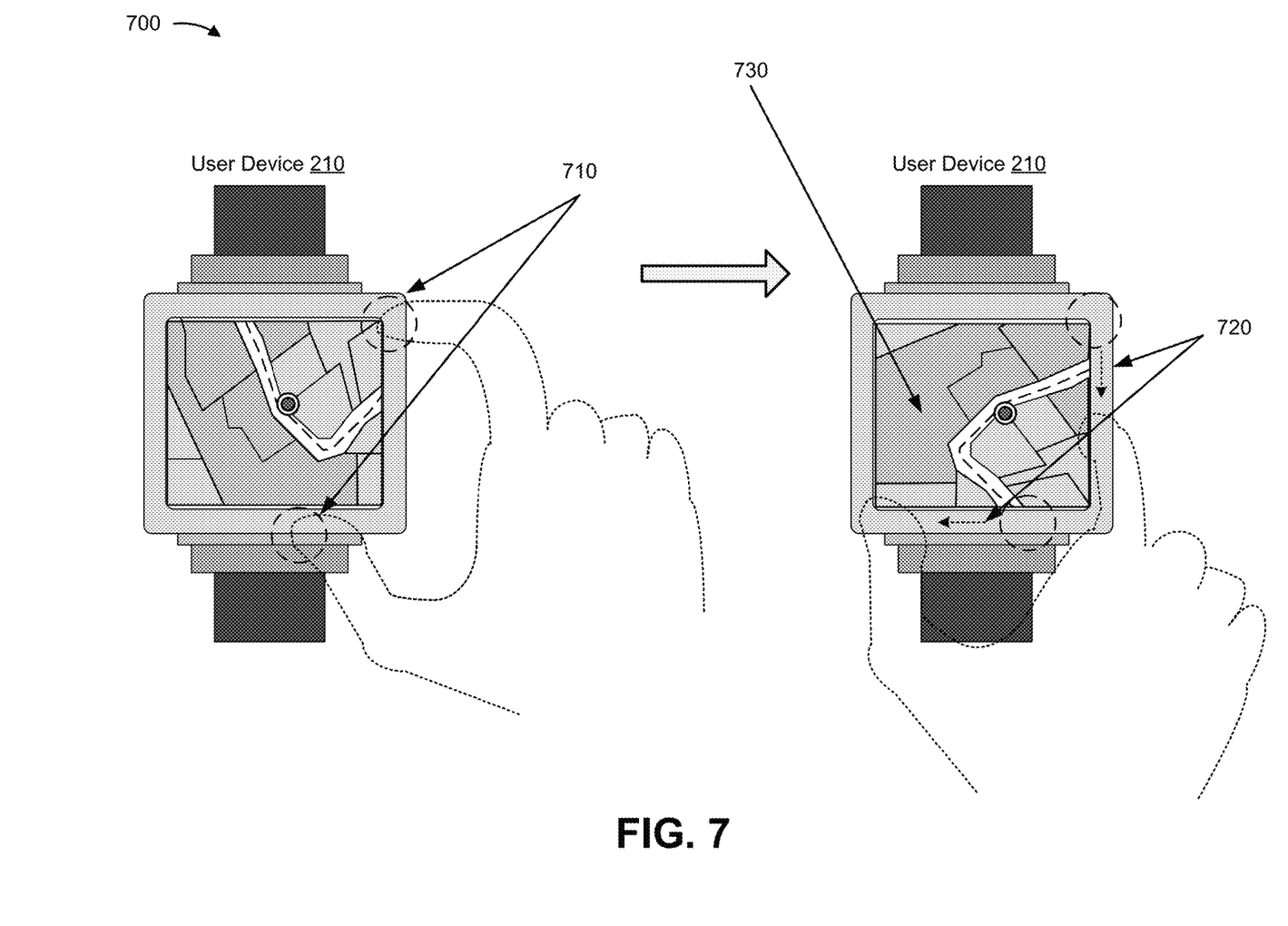
FIG. 7 is a diagram of an example implementation relating to the example process shown in FIG. 4.

FIG. 7 is a diagram of an example implementation 700 relating to example process 400 shown in FIG. 4. FIG. 7 shows an example of enabling perimeter-based user interactions with a user device.

As shown in FIG. 7, user device 210 may rotate screen information based on detecting multiple swipes. For example, as shown by reference number 710, a user may interact with the perimeter area of user device 210 at a first position to establish a first point of contact and at a second position to establish a second point of contact. As shown by reference number 720, the user may move the first point of contact in a vertical direction to a third position, and may move the second point of contract in a horizontal direction to a fourth position. User device 210 may detect the user interaction and may determine an action associated with the user interaction.

As shown by reference number 730, user device 210 may rotate the screen information (e.g., a map associated with a map application). In this way, a user may perform multiple touch gestures in association with the perimeter area of user device 210 to manipulate screen information being provided for display in associated with the display area.

As indicated above, FIG. 7 is provided merely as an example. Other examples are possible and may differ from what was described with regard to FIG. 7.

Implementations described herein may assist a user device in enabling perimeter-based user interactions. In this way, a user may manipulate screen information by performing touch gestures with a perimeter area of the user device, which may allow screen information to remain visible to a user as the user interacts with the user device. Implementations described herein may assist a user in using a user device in an efficient manner, thereby reducing operating errors and conserving processor and/or memory resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user device, comprising:
a display including a first area and a second area,
the first area being located around a periphery of the second area,
the first area including a touch-sensitive surface; and
one or more processors to:
receive a configuration file;
store mapping information that identifies a mapping of a user interaction to an action associated with an application based on the configuration file,
the user interaction associated with the first area, and
the application associated with information, including one or more icons, displayed in the second area,
an icon, of the one or more icons, being used to open the application;
detect the user interaction,
the user interaction associated with one or more coordinate values;
determine that the user interaction is associated with the first area based on the one or more coordinate values and the configuration file,
the user interaction occurring in the first area and not directly occurring with the icon;
determine the action associated with the user interaction based on the mapping,
the action to be performed in association with the information displayed in the second area;
perform the action in association with the information displayed in the second area,
the action including opening the application associated with the icon;
determine whether the application is a particular application; and
increase a size of the second area to cover an entirety of the display after opening the application based on determining that the application is the particular application,
the first area no longer being displayed on the user device.

2. The user device of claim 1, where the one or more processors, when detecting the user interaction with the first area, are to:
detect a movement of a point of contact from a first position associated with the first area to a second position associated with the first area,
the movement being associated with a clockwise or counterclockwise direction; and
where the one or more processors, are further to:
perform a scroll operation of the information displayed in the second area.

3. The user device of claim 1, where the one or more processors, when detecting the user interaction with the first area, are to:
detect a movement of a point of contact from a first position associated with the first area to a second position associated with the first area,
the movement being associated with a clockwise or counterclockwise direction; and
where the one or more processors, are further to:
perform a zoom operation of the information displayed in the second area.

4. The user device of claim 1, where the one or more processors, when determining the action associated with the user interaction, are to:
determine a first action associated with the user interaction;
determine a second action associated with the user interaction; and
where the one or more processors, when performing the action in association with the information displayed in the second area, are to:

perform the first action based on a first information displayed in the second area; and perform the second action based on a second information displayed in the second area.

5. The user device of claim 1, where the user device is a wearable user device.

6. The user device of claim 1, where the one or more processors, when detecting the user interaction with the first area, are to:
determine a parameter associated with the user interaction; and
where the one or more processors, when performing the action in association with the information displayed in the second area, are to:
perform the action based on the parameter.

7. The user device of claim 1, where the user interaction includes at least one of: a tap, a swipe, a nudge, a pinch, a spread, a slide, a drag, or a flick.

8. A non-transitory computer-readable medium storing instructions, the instructions comprising:
one or more instructions that, when executed by one or more processors of a user device, cause the one or more processors to:
receive a configuration file;
store mapping information that identifies a mapping of a user interaction to an action associated with an application based on the configuration file,
the user interaction associated with a first area, and
the application associated with information, including one or more icons, displayed in a second area,
an icon, of the one or more icons, being used to open the application;
detect the user interaction with a display of the user device,
the display including the first area and the second area,
the first area being associated with a touch-sensitive surface,
the first area surrounding the second area, and
the user interaction associated with one or more coordinate values;
determine that the user interaction is associated with the first area based on the one or more coordinate values and the configuration file,
the user interaction occurring in the first area and not directly occurring with the icon;
determine the action associated with the user interaction based on the mapping information,
the action to be performed in association with the information being displayed in the second area;
perform the action in association with the information being displayed in the second area,
the action including opening the application associated with the icon;
determine whether the application is a particular application; and
increase a size of the second area to cover an entirety of the display after opening the application based on determining that the application is the particular application,
the first area no longer being displayed on the user device.

9. The non-transitory computer-readable medium of claim 8, where the one or more instructions, that cause the one or more processors to receive the configuration file:
receive a user-configuration that identifies the action associated with the user interaction; and
where the one or more instructions, that cause the one or more processors to determine the action associated with the user interaction, cause the one or more processors to:
determine the action based on the user-configuration.

10. The non-transitory computer-readable medium of claim 8, where the one or more instructions, when executed by the one or more processors, further cause the one or more processors to:
generate information that includes the mapping of the user interaction to the action to permit the mapping to be shared with another device.

11. The non-transitory computer-readable medium of claim 8, where the user device includes a smart watch.

12. The non-transitory computer-readable medium of claim 8, where the one or more instructions, when executed by the one or more processors, further cause the one or more processors to:
display the first area based on detecting the user interaction.

13. The non-transitory computer-readable medium of claim 8, where the one or more instructions, that further cause the one or more processors to:
determine another action associated with the application when the application is incapable of processing the user interaction, and
perform the other action.

14. The non-transitory computer-readable medium of claim 8, where the user interaction includes at least one of: a tap, a swipe, a nudge, a pinch, a spread, a slide, a drag, or a flick.

15. A method, comprising:
receiving, by a user device, a configuration file;
storing, by the user device, mapping information that identifies a mapping of a user interaction to an action associated with an application based on the configuration file,
the user interaction associated with a first area associated with a display of the user device, and
the application associated with information, including one or more icons, displayed in a second area associated with the display of the user device,
an icon, of the one or more icons, being used to open the application;
detecting, by the user device, the user interaction associated with the display of the user device,
the display including the first area and the second area,
the first area including a touch-sensitive surface,
the first area being located around a periphery of the second area, and
the user interaction associated with one or more coordinates;
determining, by the user device, that the user interaction is associated with the first area based on the one or more coordinates and the configuration file,
the user interaction occurring in the first area and not directly occurring with the icon;
determining, by the user device, the action associated with the user interaction based on the mapping,
the action to be performed in association with the information displayed in the second area;
performing, by the user device, the action in association with the information displayed in the second area,
the action including opening the application associated with the icon;
determining, by the user device, whether the application is a particular application; and increasing, by the user device, a size of the second area to cover an entirety of the display after opening the application based on determining that the application is the particular application,
the first area no longer being displayed on the user device.

16. The method of claim 15, where determining the action associated with the user interaction comprises:
determining the action associated with the user interaction based on a screen associated with the information displayed in the second area.

17. The method of claim 15, further comprising:
determining that a parameter associated with the user interaction satisfies a threshold; and
performing the action based on the parameter satisfying the threshold.

18. The method of claim 15, further comprising:
determining another action associated with the application when the application is incapable of processing the user interaction, and
performing the other action.

19. The method of claim 15, further comprising:
provide information provided in the configuration file to another device,
the information being used to identify a configuration without the other device needing to be reconfigured by a user.

20. The method of claim 15, further comprising:
generating an executable file that includes the mapping of the user interaction to the action to permit the mapping to be shared with another device.

* * * * *